(12) United States Patent
Hou et al.

(10) Patent No.: US 7,466,693 B2
(45) Date of Patent: Dec. 16, 2008

(54) GLOBAL INTERNET VOICE COMMUNICATION SYSTEM

(76) Inventors: Erh-Jen Hou, Room 325, 3F, No. 19-11, Sanchung Rd., Taipei (TW); Chun-Wei Lien, Room 325, 3F, No. 19-11, Sanchung Rd., Taipei (TW); Guan-Hung Yeh, Room 325, 3F, No. 19-11, Sanchung Rd., Taipei (TW); Er-Ta Ma, Room 325, 3F, No. 19-11, Sanchung Rd., Taipei (TW); Ming-Shun Hsiao, Room 325, 3F, No. 19-11, Sanchung Rd., Taipei (TW); Wen-Cheng Liu, Room 325, 3F, No. 19-11, Sanchung Rd., Taipei (TW)

( * ) Notice: Subject to any disclaimer, the term of this patent is extended or adjusted under 35 U.S.C. 154(b) by 585 days.

(21) Appl. No.: 11/044,924

(22) Filed: Jan. 26, 2005

(65) Prior Publication Data

US 2006/0165061 A1 Jul. 27, 2006

(51) Int. Cl.
*H04L 12/28* (2006.01)
*H04L 12/66* (2006.01)
*H04M 11/00* (2006.01)
*G06F 15/16* (2006.01)

(52) U.S. Cl. .................. 370/352; 370/401; 370/356; 379/93.24; 379/142.17; 709/227

(58) Field of Classification Search ......... 370/352–356, 370/401–419; 709/217–219, 223–227; 379/93–106, 379/142–373
See application file for complete search history.

(56) References Cited

U.S. PATENT DOCUMENTS

| | | | | |
|---|---|---|---|---|
| 5,838,682 | A * | 11/1998 | Dekelbaum et al. ......... | 370/401 |
| 6,188,762 | B1 * | 2/2001 | Shooster ................ | 379/265.09 |
| 6,385,646 | B1 * | 5/2002 | Brown et al. ................ | 709/217 |
| 6,788,769 | B1 * | 9/2004 | Waites ...................... | 379/93.24 |
| 6,853,713 | B1 * | 2/2005 | Fobert et al. ........... | 379/142.17 |
| 7,325,029 | B1 * | 1/2008 | Chang ........................ | 709/203 |
| 7,346,671 | B2 * | 3/2008 | Hankejh et al. ............. | 709/219 |
| 2002/0042825 | A1 * | 4/2002 | Gee ........................... | 709/227 |
| 2004/0001482 | A1 * | 1/2004 | Yeom ......................... | 370/356 |
| 2005/0111439 | A1 * | 5/2005 | Yarlagadda et al. ......... | 370/352 |
| 2005/0172018 | A1 * | 8/2005 | Devine et al. ............... | 709/223 |
| 2005/0265322 | A1 * | 12/2005 | Hester ........................ | 370/352 |
| 2006/0069781 | A1 * | 3/2006 | Hou et al. ................... | 709/227 |
| 2006/0072723 | A1 * | 4/2006 | Chung ..................... | 379/93.24 |
| 2008/0112391 | A1 * | 5/2008 | Hwang et al. ............... | 370/352 |

* cited by examiner

*Primary Examiner*—M. Phan
(74) *Attorney, Agent, or Firm*—Pro-Techtor Int'l Services

(57) ABSTRACT

A global communication internet telephone system is a new software Web Call structure, in which the system user only requires a computer with Windows 98® or above, a duplex sound card, a display interface and internet access, and logging directly into a GTD Web 800 web page thereafter, receiving a automatic number dispensing function and GTD automatic number skipping function. The characteristics of the system lies in that a signature which can be linked to the GTD Web 800 web pages for browsing is added into an e-mail of a user computer. As long as an e-mail receiver clicks on the signature file of the e-mail, he can be linked to the web pages and conduct a VoIP dialog with the e-mail sender. If a computer at a sending side is not powered on the sending side can freely choose whether to forward incoming calls to a designated cellular phone or local phone by automatically appointing a number.

5 Claims, 3 Drawing Sheets

GLOBAL INTERNET VOICE COMMUNICATION SYSTEM

BACKGROUND OF THE INVENTION (a) Field of the Invention

The present invention relates to an internet voice communication carrier system used by computer web pages. The system adds a signature file which can be linked to a GTD web page into an e-mail box. By point and click with the GTD Web800 web pages, a user can conduct an internet VOIP dialog with the other party.

(b) Description of the Prior Art

With the development of the Internet, the Web Call system has also been renovated many times over. There are already internet phones on the market, but due to the difficulty in system installations and high capitals, the mobility of usage by system users are not high, therefore the internet phone has never become widespread. In addition, the conventional internet phone cannot add a signature file into an e-mail box for conducting internet dialogs with the other party, either.

SUMMARY OF THE INVENTION

It is a primary objective of the present invention to provide a user with only a computer that has an operating system of Windows 98® or above (including MS Internet Explorer®), a duplex sound card, a display interface and Internet access, to enable the user directly logging into Web Call 800 web page and receiving an automatic number dispenser function and a GTD number skipping function. Since no complex hardware is needed for installation, only appointing a number dispensing interval, a number for automatic skipping and an address of the website containing the GTD is needed, the components and the corresponding web pages expressing language documents are put together thereafter. The major characteristics lies in that a signature file is added into an e-mail of a user computer linked to the GTD Web800 web pages, and internet VOIP dialogs can be conducted with an e-mail sender as long as the e-mail receiver points and clicks on the signature file in the e-mail.

Another objective of the present invention is that when a computer at a sending side is not powered on, the sending side can freely choose whether forward incoming calls to a designated cellular phone or local phone by automatically appointing a number.

The aforesaid Web Call structure is commonly known as GTD (Global Telephone Directly). GTD is a component of Active X on a web page, used for Internet voice communication.

To enable a further understanding of the said objectives and the technological methods of the invention herein, the brief description of the drawings below is followed by the detailed description of the preferred embodiments.

DETAILED DESCRIPTION OF THE PREFERRED EMBODIMENTS

Figure 1:
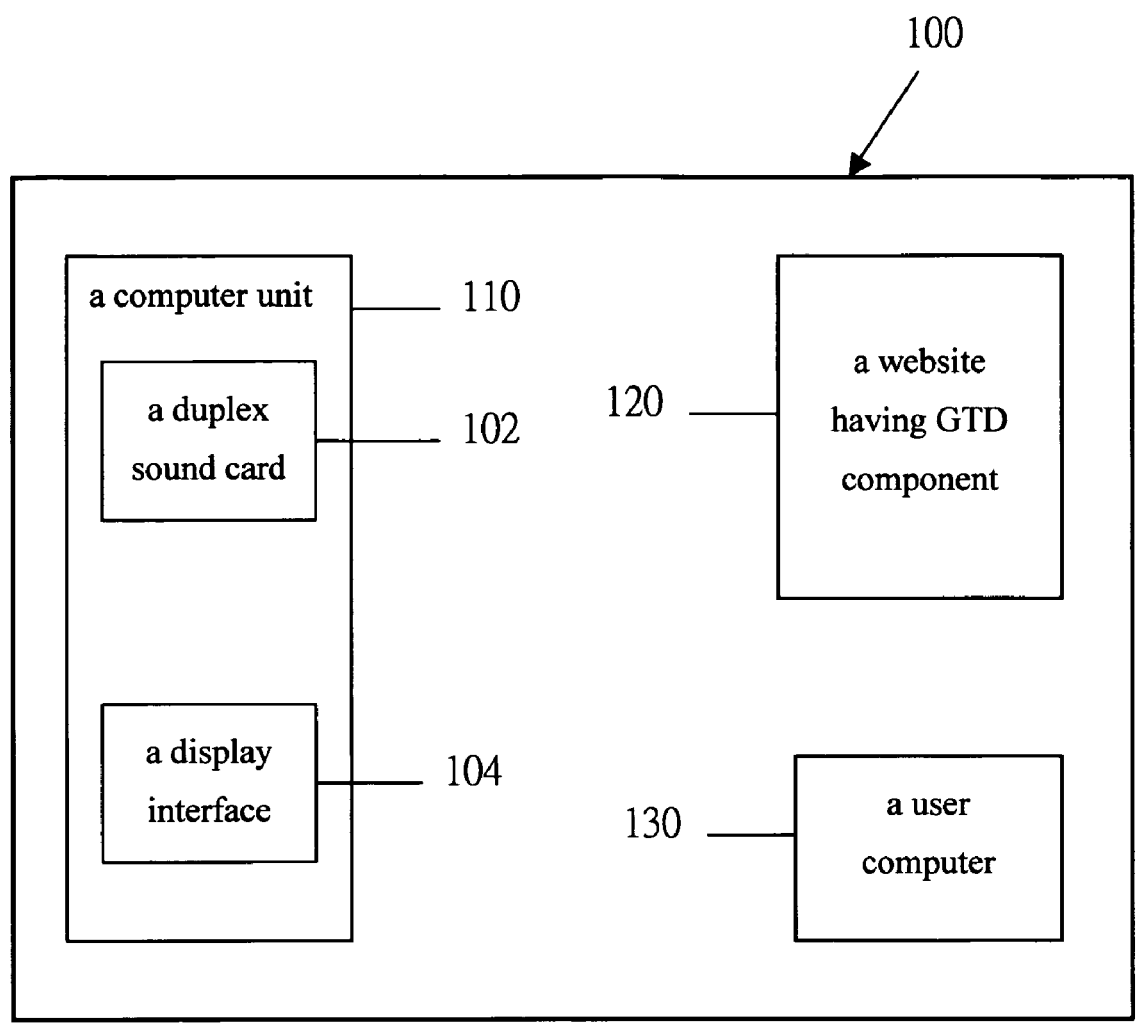
FIG. 1 shows a structural block diagram according to the present invention.

As shown in FIG. 1, a system 100 consists of a computer unit 110, a website 120 having GTD component and a user computer 130 that is logged into a GTD appointed taxi internet communication system, in addition, a computer with an operating system of windows 98 or above, a duplex sound card 102, a display interface 104 and Internet access is required.

Figure 2:
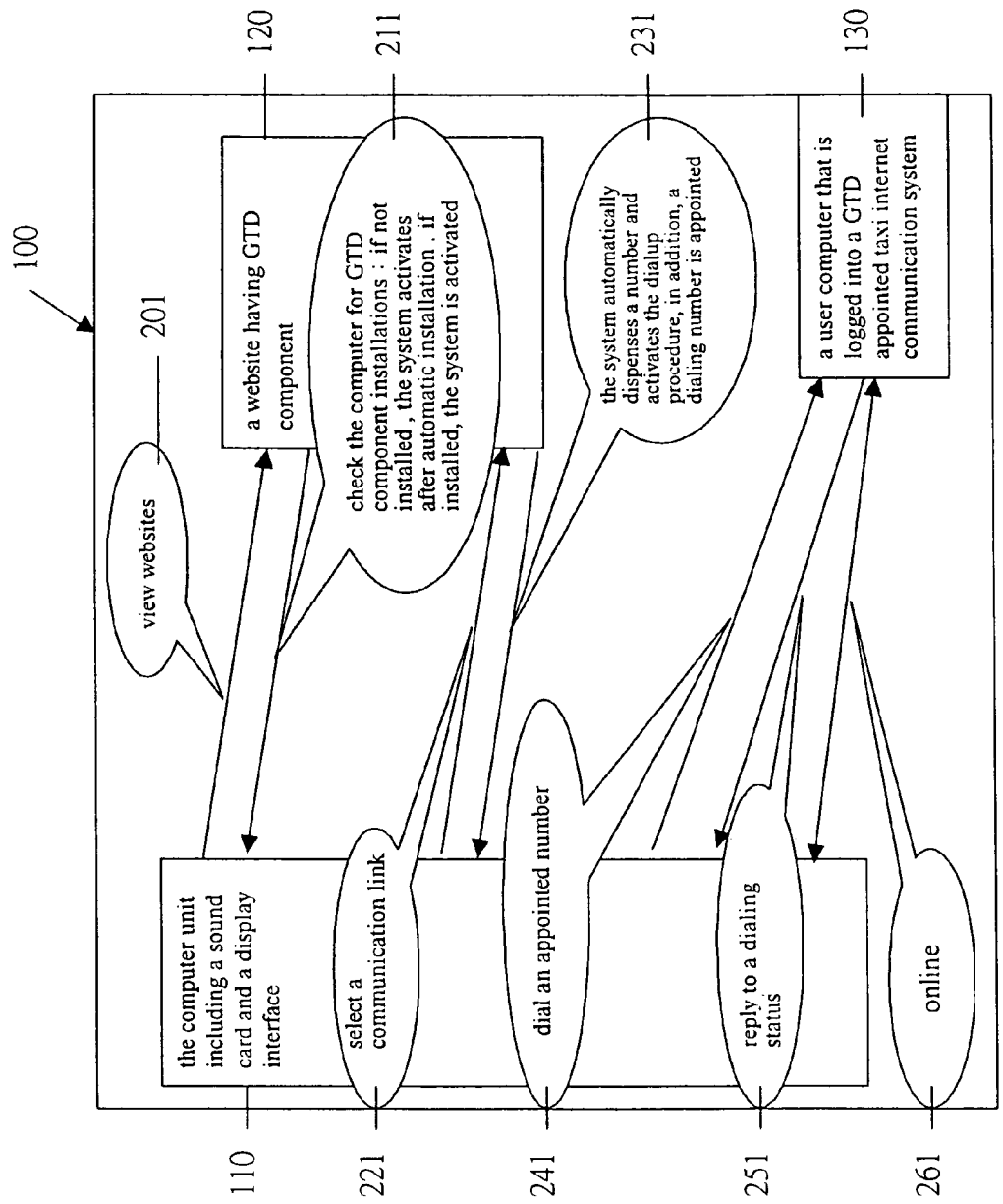
FIG. 2 shows a flow chart block diagram according to the present invention.

The flow chart diagram of the GTD system as shown in FIG. 2 comprises:
1. A user views websites with GTD components 201 by using the computer unit 110 including a sound card and a display interface.
2. Checking the computer 110 for GTD component 211 installations
   (1) If GTD components are not installed, the system 100 activates after automatic installation.
   (2) The system is activated if GTD components are installed.
3. User can select a communication link 221 from the GTD component web page 120.
4. The system 100 automatically dispenses a number and activates the dialup procedure, in addition, a dialing number 231 is appointed thereafter.
5. The user then dials an appointed number 241.
6. The user's computer is then logged into a GTD appointed TAXI internet telephone system 130 and replies to a dialing status.
7. Online 261.

The aforesaid invention has three main functions:
   (1) Direct login into GTD WEB 800 website:
      The user only needs a computer unit that has an operating system of Windows 98 or above (including MS Internet Explorer), a duplex sound card, a display interface and Internet access. The web call communication function is activated through the application of MS Internet Explorer software.
   (2) Automatic appointment of number to a user:
      When the user selects a button on the GTD website, the system automatically and systematically appoints a communication group. If the next user is offline or busy, the system automatically skips to the next appointed verified number.
   (3) Automatic number skipping:
      When the user selects a button on the GTD website, a communication group is automatically and systematically dialed up by the system. If the next user is offline or busy, the system automatically skips to the next appointed verified number.

Figure 3:
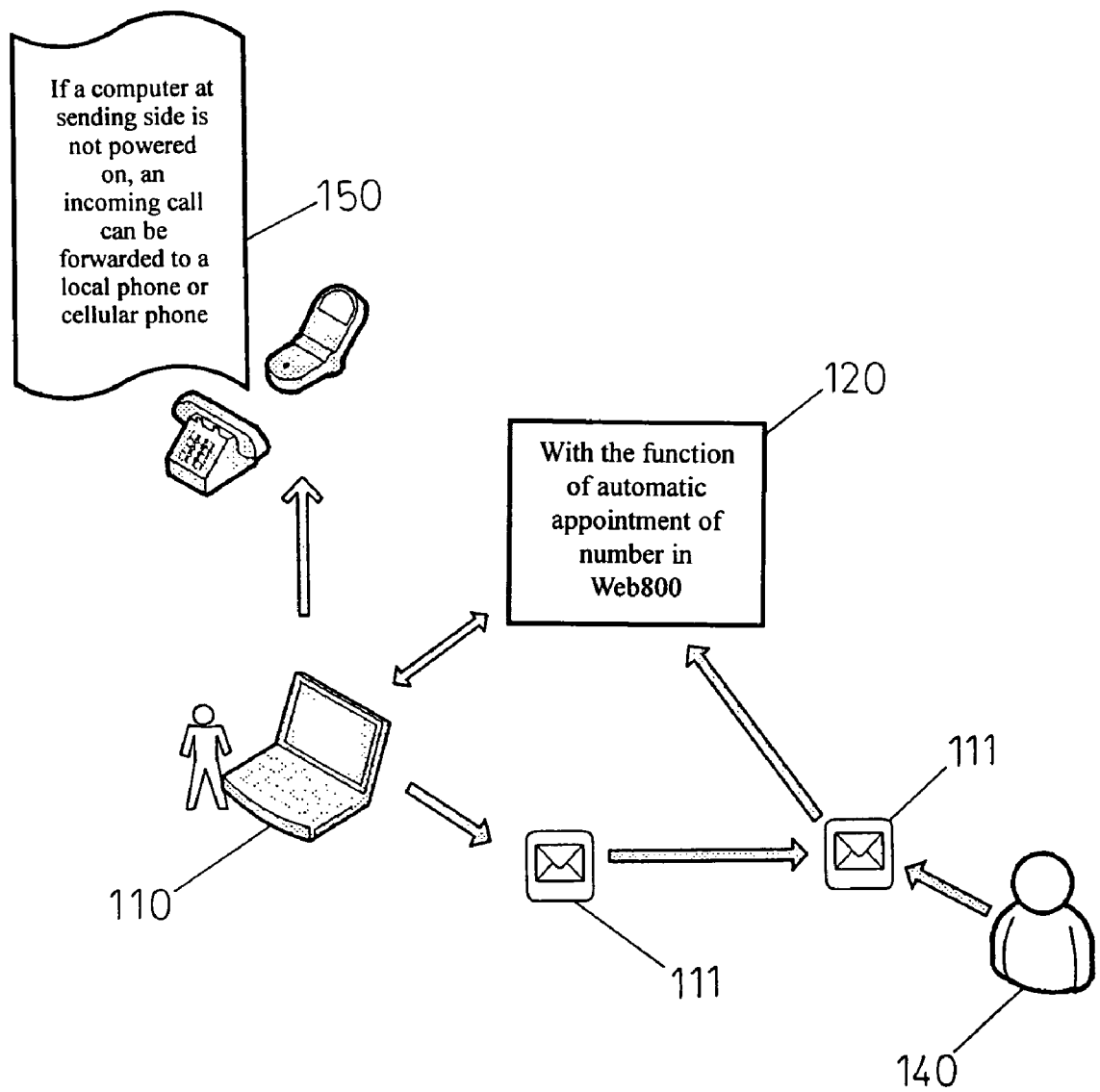
FIG. 3 shows a flow chart block diagram according to the present invention.

As shown in FIG. 3, the major characteristics of the present invention lies in that when the user computer (sending side) 110 links to the web page 120 having the function of automatic appointment of a number appointment of GTD (Web800), a signature file 111 is added into an e-mail (e-mail box). As long as an e-mail receiver 140 clicks on the signature file 111 of the e-mail, he can be linked to the web page 120 to conduct an internet voice (VOIP) dialog with an e-mail sender.

When the user computer (sending side) 110 is not power on, the sending side can freely choose whether to forward incoming calls, to automatically forward to a designated cellular phone or local phone 150.

In conclusion, the aforesaid system entirely corrects the deficiency of Web Call, in addition, the provided GTD has login, automatic number appointing and automatic number skipping capabilities. Since no complex hardware is needed for installation, only appointing a number dispensing interval, a number for automatic skipping and an address of the website containing the GTD is needed, moreover, the components are put together to achieve the aforesaid functions. More importantly, a signature file can be added into an e-mail of the user computer linked to the GTD Web800 web pages, and the web pages can be linked and a VOIP dialog can be conducted with an e-mail sender, as long as the e-mail receiver clicks on the signature file.

It is of course to be understood that the embodiment described herein is merely illustrative of the principles of the invention and that a wide variety of modifications thereto may be effected by persons skilled in the art without departing from the spirit and scope of the invention as set forth in the following claims.

What is claimed is:

1. A method of global communication using an internet telephone system within a Web Call structure, comprising the steps of:

logging on, by a first user, an internet connection to a Web800 web page having GTD (Global Telephone Director) components, using a computer unit having a sound card and a display interface;

activating a GTD connection between said computer unit and a Web800 web page having GTD components;

addressing a second user computer for establishing voice communication therewith; and establishing VoIP communication between said computer unit of said first user and said second user computer;

wherein GTD is a component of Active X® in a web page applied for internet voice communicating, whereby a signature file which is linked to the web page for browsing is added into an e-mail, and the web pages can be linked and an Internet VoIP dialog can be conducted with an e-mail sender, as ion as an e-mail receiver clicks on the signature file of the e-mail;

wherein the step of logging on further comprises the steps of:

logging onto an internet access, by a first user, using a computer unit having a sound card and a display interface; and viewing, via said computer unit, a Web800 web page having GTD components;

wherein the step of activating a GTD connection further comprises the steps of:

checking of said computer unit for installed GTD components, by the GTD components of the web page;

installing GTD components on said computer unit by the GTD components of the web page, if not previously installed; and activating the installed GTD components; and wherein the step of addressing a second user computer further comprises the steps of:

selecting, by the first user, a communication link from the GTD components of the web page;

dispensing a number automatically, activating a dial-up procedure, and appointing a dialing number, by the GTD components of the web page; and dialing, by the first user, of said appointed dialing number.

2. The method of global voice communication using an internet telephone system within a Web Call structure of claim 1, wherein the step of establishing VoIP communication further comprises the steps of:

logging said computer unit into a GTD appointed TAXI internet telephone system;

replying, by said computer unit, to a dialing status; and establishing VoIP voice communication over the Internet.

3. The method of global voice communication using an internet telephone system within a Web Call structure of claim 1, wherein when a user computer is not powered on, a sending side can freely choose whether to forward incoming calls to a designated cellular phone or local phone by automatically appointing a number.

4. The method of global voice communication using an internet telephone system within a Web Call structure of claim 1, wherein said computer unit has an operating system of Windows 98 or above including MS Internet Explorer.

5. The method of global voice communication using an internet telephone system within a Web Call structure of claim 1, wherein no complex hardware is needed for installation, only appointing a number dispensing interval, a number for automatic skipping and an address of the website containing the GTD is needed, the components and the corresponding web pages expressing language documents are put together thereafter.

* * * * *